US010928986B1

(12) United States Patent
Dinh et al.

(10) Patent No.: US 10,928,986 B1
(45) Date of Patent: Feb. 23, 2021

(54) TRANSACTION VISIBILITY FRAMEWORKS IMPLEMENTED USING ARTIFICIAL INTELLIGENCE

(71) Applicant: EMC IP Holding Company LLC, Hopkinton, MA (US)

(72) Inventors: Hung T. Dinh, Austin, TX (US); Kiran Kumar Pidugu, SangaReddy (IN); Sabu K. Syed, Austin, TX (US); Lakshman Kumar Tiwari, Uttar Pradesh (IN); Rajesh Krishnan, Bangalore (IN); Seshadri Srinivasan, Shrewsbury, MA (US); Puneet Arora, New Delhi (IN); Geetha Venkatesan, Bangalore (IN); Sourav Datta, Bangalore (IN); Vijaya P. Sekhar, Bangalore (IN); Manikandan Rathinavelu, Cedar Park, TX (US); Ranjani M. Venkata, Leander, TX (US); Muhammed Mohiuddin, Cedar Park, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/671,363

(22) Filed: Nov. 1, 2019

(51) Int. Cl.
*G06F 3/0482* (2013.01)
*G06F 16/248* (2019.01)
(Continued)

(52) U.S. Cl.
CPC ........ *G06F 3/0482* (2013.01); *G06F 3/04842* (2013.01); *G06F 16/248* (2019.01);
(Continued)

(58) Field of Classification Search
CPC .... G06F 3/0482; G06F 3/04842; G06F 21/55; G06F 16/26; G06F 16/248; G06T 11/206; G06T 20/00
See application file for complete search history.

(56) References Cited

U.S. PATENT DOCUMENTS

| 8,190,731 B2 | 5/2012 | Sabry et al. |
| 2005/0043961 A1 | 2/2005 | Torres et al. |

(Continued)

OTHER PUBLICATIONS

SteelCentral, SteelCentral Transaction Analyzer, https://web.archive.org/web/20190901001341/https://www.riverbed.com/products/steelcentral/steelcentral-transaction-analyzer.html, Sep. 1, 2019.

(Continued)

*Primary Examiner* — Roland J Casillas
(74) *Attorney, Agent, or Firm* — Ryan, Mason & Lewis, LLP

(57) ABSTRACT

Methods, apparatus, and processor-readable storage media for transaction visibility framework implemented using artificial intelligence are provided herein. An example computer-implemented method includes monitoring data related to a transaction flow across multiple layers of an enterprise system; determining which of the multiple layers correspond to at least one detected problem within the transaction flow by applying artificial intelligence techniques to the data; generating a visualization of the transaction flow, wherein generating the visualization comprises generating a sequential view of the transaction flow, generating one or more parallel sub-transaction flows pertaining to one or more dependencies of the transaction flow, and producing a visual indication of the detected problem; determining, based on analyzing the generated visualization, one or more automated actions related to the detected problem and the determined layer of the enterprise system corresponding to (Continued)

the detected problem; and automatically initiating the one or more automated actions.

20 Claims, 4 Drawing Sheets

(51) Int. Cl.
    *G06F 16/26*     (2019.01)
    *G06Q 10/06*     (2012.01)
    *G06Q 20/40*     (2012.01)
    *G06N 20/00*     (2019.01)
    *G06T 11/20*     (2006.01)
    *G06F 21/55*     (2013.01)
    *G06F 3/0484*     (2013.01)

(52) U.S. Cl.
    CPC .............. *G06F 16/26* (2019.01); *G06F 21/55* (2013.01); *G06N 20/00* (2019.01); *G06Q 10/06* (2013.01); *G06Q 20/4016* (2013.01); *G06T 11/206* (2013.01)

(56) References Cited

U.S. PATENT DOCUMENTS

2018/0121032 A1*   5/2018   Naous ..................... H04L 41/12
2018/0314576 A1*  11/2018   Pasupuleti .......... G06F 11/3089

OTHER PUBLICATIONS

AppDynamics, Transaction Analytics, https://www.appdynamics.com/product/transaction-analytics/, Oct. 30, 2019.

* cited by examiner

US 10,928,986 B1

TRANSACTION VISIBILITY FRAMEWORKS IMPLEMENTED USING ARTIFICIAL INTELLIGENCE

FIELD

The field relates generally to information processing systems, and more particularly to techniques for processing transaction data in such systems.

BACKGROUND

Due to large numbers of transactions and related data flows which pass through different technology layers within various enterprise systems, conventional transaction data management approaches face challenges in tracking and tracing transactions end-to-end. Additionally, such conventional approaches face further challenges in identifying particular problem areas in multi-layer transaction data, thereby creating inefficiencies with respect to reprocessing and/or resubmitting problematic transactions.

SUMMARY

Illustrative embodiments of the disclosure provide transaction visibility framework implemented using artificial intelligence. An exemplary computer-implemented method includes monitoring data related to a transaction flow across multiple layers of at least one enterprise system, and determining which of the multiple layers correspond to at least one detected problem within the transaction flow by applying one or more artificial intelligence techniques to the data related to the transaction flow. Such a method also includes generating a visualization of the transaction flow, wherein generating the visualization includes generating a sequential view of the transaction flow, generating one or more parallel sub-transaction flows pertaining to one or more dependencies of the transaction flow, and producing at least one visual indication of the at least one detected problem within the transaction flow. Further, such a method additionally includes determining, based at least in part on analyzing the generated visualization, one or more automated actions related to the at least one detected problem and the determined layer of the at least one enterprise system corresponding to the at least one detected problem, and automatically initiating the one or more automated actions.

Illustrative embodiments can provide significant advantages relative to conventional transaction data management approaches. For example, challenges associated with identifying particular problem areas in multi-layer transaction data are overcome in one or more embodiments through identifying transaction flow problem areas via application of artificial intelligence techniques and generating granular visualizations of transaction flows across multiple layers of enterprise systems.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
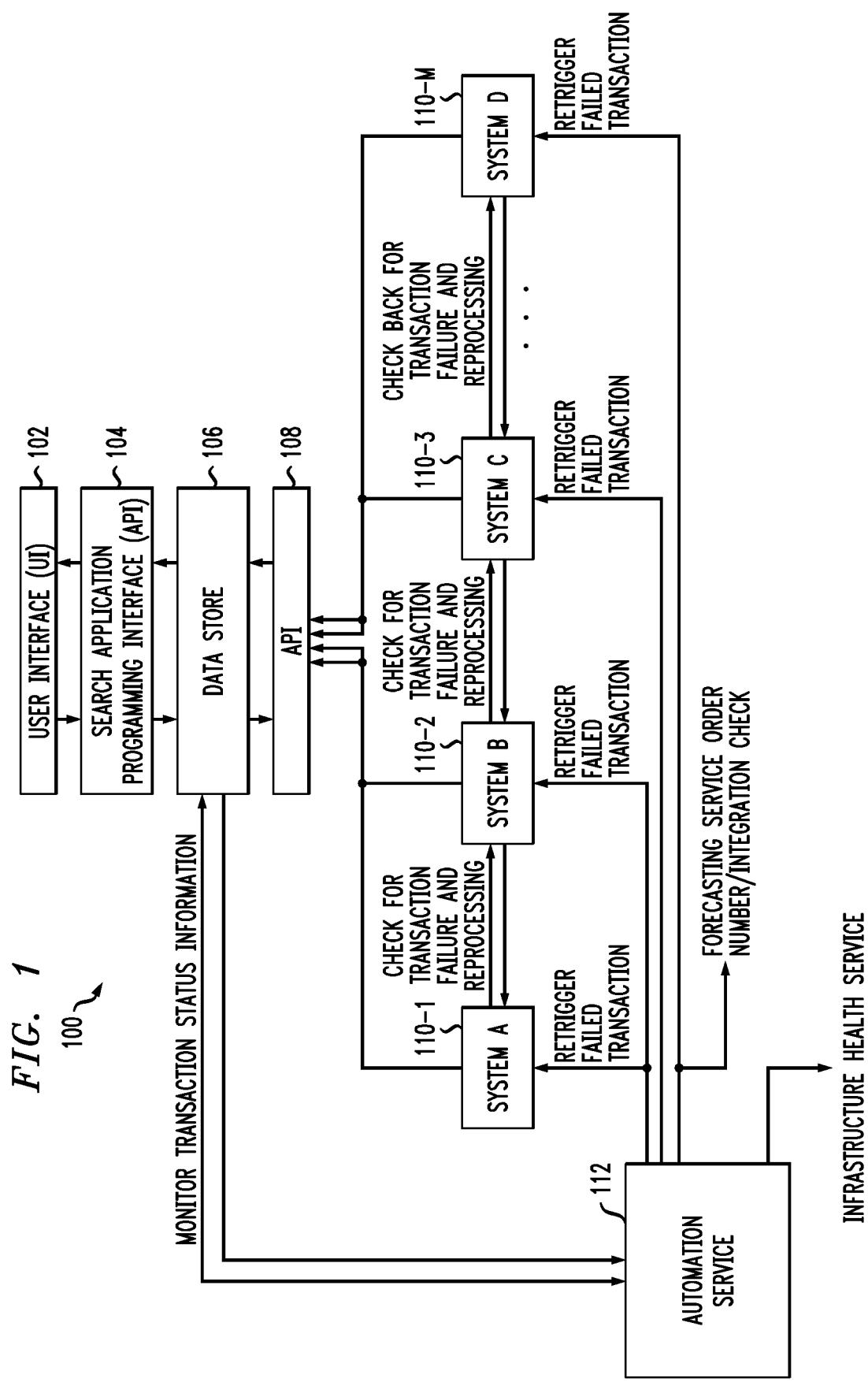
FIG. 1 shows an information processing system configured for transaction visibility implemented using artificial intelligence in an illustrative embodiment.

FIG. 1 shows a computer network (also referred to herein as an information processing system) 100 configured in accordance with an illustrative embodiment. The computer network 100 comprises a plurality of systems 110-1, 110-2, 110-3, . . . 110-M, collectively referred to herein as user systems 110. The systems 110 are coupled to a network, where the network in this embodiment is assumed to represent a sub-network or other related portion of the larger computer network 100. As also illustrated in FIG. 1, the systems 110 push log data related to application data from the systems to application programming interface (API) 108.

The systems 110 may comprise, for example, mobile telephones, laptop computers, tablet computers, desktop computers or other types of computing devices and/or combinations/collections thereof. Such devices are examples of what are more generally referred to herein as "processing devices."

The systems 110 in some embodiments comprise respective processing devices associated with a particular company, organization or other enterprise or collection of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, API 108, subsequent to receiving the data from systems 110, interacts with data store 106 configured to store data pertaining to transactions such as, for example, transaction status information pertaining to transactions being carried out within one or more enterprises.

The data store 106 in the present embodiment is implemented using one or more storage systems associated with the information processing system 100. Such storage systems can comprise any of a variety of different types of storage including network-attached storage (NAS), storage area networks (SANs), direct-attached storage (DAS) and distributed DAS, as well as combinations of these and other storage types, including software-defined storage.

More specifically, FIG. 1 depicts an example sequence of steps to track and trace any onboard business flows (also referred to herein as transactions) across multiple enterprise systems 110. Such a sequence starts when a user enters the transaction identifier (TID) of a particular business flow into user interface (UI) 102. The TID is used as the search parameter by search API 104, which queries the data store 106. The data store 106 then returns a result set (which can include, for example, other information about the business flow such as service name, status, transaction date, domain, integration application name and unique global ID) to search API 104 and displays the same to the user via UI 102.

Additionally, when there is a failure, at least one embodiment includes programmatically determining where the problem is; that is, which system in the business flow that fails (110-1, 110-2, 110-3, 110-M, etc.). Subsequently, such an embodiment includes passing the TID to API 108 to query data store 106, then push data to search API 104 and ultimately UI 102.

As also depicted in FIG. 1, automation service 112 also relies on the TDI to search in data store 106, wherein such searching aims to return data first to automation service 112 and then to the appropriate system that failed (110-1, 110-2, 110-3, 110-M, etc.). Subsequently, a retrigger mechanism is activated in association with automation service 112 to reprocess the failed TID at one or more of the systems 110.

Systems 110 and automation service 112 in the FIG. 1 embodiment are assumed to be implemented using at least one processing device. Each such processing device generally comprises at least one processor and an associated memory, and implements one or more functional modules for controlling certain features of systems 110 and automation service 112. The processor illustratively comprises a microprocessor, a microcontroller, an application-specific integrated circuit (ASIC), a field-programmable gate array (FPGA) or other type of processing circuitry, as well as portions or combinations of such circuitry elements. The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

It is to be appreciated that this particular arrangement of elements illustrated in the FIG. 1 embodiment is presented by way of example only, and alternative arrangements can be used in other embodiments. For example, the functionality associated with UI 102, search API 104, API 108, and automation service 112 in other embodiments can be combined into a single module, or separated across a larger number of modules. It is to be understood that the particular set of elements shown in FIG. 1 is presented by way of illustrative example only, and in other embodiments additional or alternative elements may be used. Thus, another embodiment includes additional or alternative systems, devices and other network entities, as well as different arrangements of modules and other components.

An exemplary process utilizing one or more of the elements in computer network 100 will be described in more detail with reference to the flow diagram of FIG. 4.

Accordingly, at least one embodiment of the invention includes generating and/or implementing an end-to-end transaction visibility framework to track and trace transactions flowing through multiple application layers of one or more enterprise systems. Such an embodiment also includes forecasting and identifying one or more problem areas within a transaction flow and one or more areas to initiate automated actions (e.g., self-healing mechanisms). Accordingly, such an embodiment includes enabling enterprises and/or other users to avoid one or more negative transaction-related impacts and/or instabilities, as well as generating and providing real-time visualization of data related to different segments of an enterprise and/or portions of a transaction flow.

One or more embodiments also includes generating multiple views of a given transaction. Such views can be generated, for example, for cascading transactions wherein dependency can have multiple levels. Accordingly, such an embodiment includes enabling tracking and tracing in a sequential flow as well as in at least one parallel flow and concurrently between multiple sets of applications and/or system components. In such an embodiment, visualizations can be generated across multiple enterprise processes such as, for example, supply chain fulfillment activities, services dispatch monitoring activities, etc.

At least one embodiment additionally includes implementing a rules-based diagnostic approach with respect to errors and/or volumes pertaining to transactions. Further, one or more embodiments include supporting messages of a variety of formats, such as, for example, flat file, JavaScript Object Notation (JSON), extensible markup language (XML), electronic data interchange (EDI), comma-separated values (CSV), etc. Also, at least one embodiment includes implementing a circuit breaking mechanism, which involves deployment and/or maintenance support produced by putting holds and/or carrying out component removals at one or more layers within at least one enterprise system.

Additionally, one or more embodiments include tracking and tracing transactions with payloads, errors, service level agreements (SLAs), and/or volumes, as well as reprocessing failed and/or missing transactions systematically. Such an embodiment includes SLA monitoring, which involves identifying which application is missing one or more SLAs and which application is taking more time to process a given transaction. Accordingly, such an embodiment includes measuring the response time of transmission from application to application within a transaction, and determining the overall transmission time of the transaction end-to-end.

Also, at least one embodiment includes error monitoring, which involves determining one or more patterns of identified errors to assist in faster issue triage and resolution. Additionally, one or more embodiments include volume monitoring, which involves sharing the volume and/or metrics of data from each application within a given transaction, and interpreting such information with respect to given temporal parameters. Such an embodiment also includes identifying duplicate transactions and redundant transactions with respect to one or more applications.

One or more embodiments can additionally include implementing an alerting mechanism, which involves integrating with various notification and/or alerting channels such as, for example, email, etc. At least one embodiment also includes implementing deployment support by enabling the ability to pause and/or resume a transaction within one or more layers. Further, one or more embodiments include viewing and downloading payloads (that is, data generated for and/or sent to third parties and/or vendors).

Figure 2A:
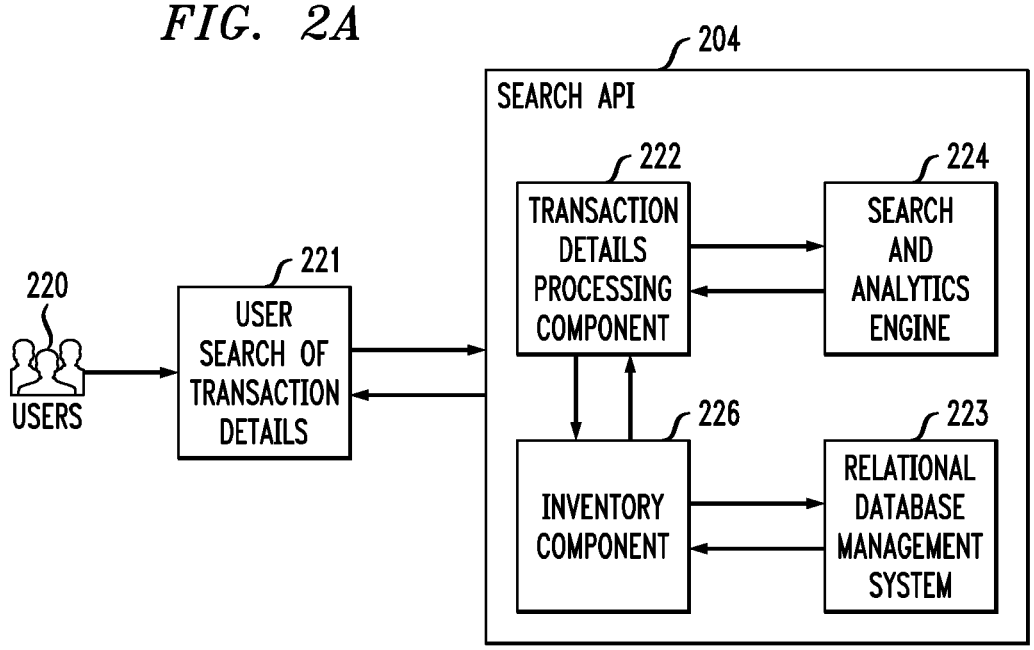
FIG. 2A and FIG. 2B show example user workflows in a transaction visibility framework in an illustrative embodiment.
Figure 2B:
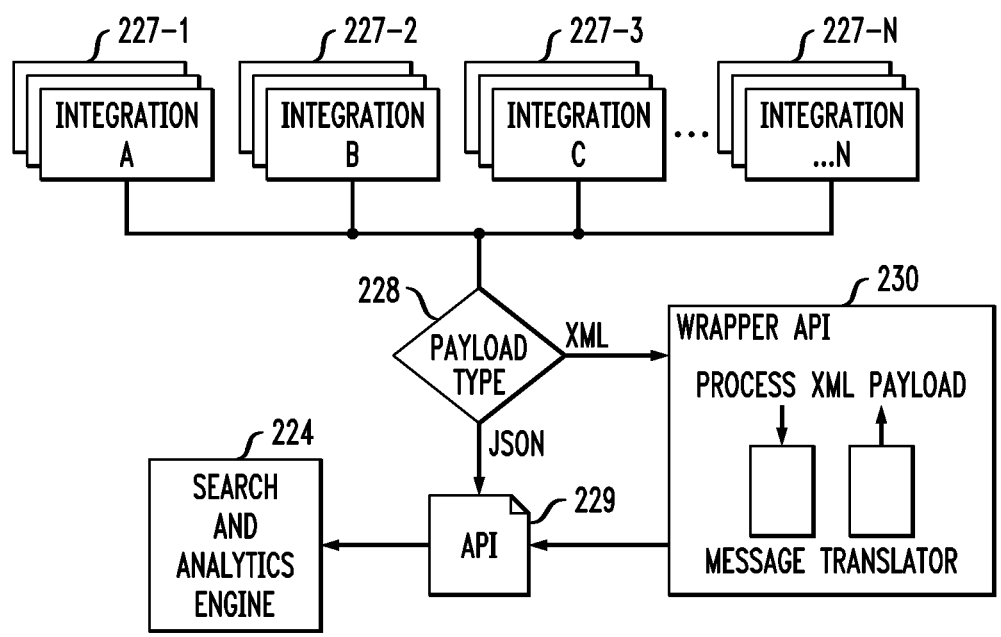

FIG. 2A and FIG. 2B show example user workflows in a transaction visibility framework in an illustrative embodiment. By way of illustration, FIG. 2A depicts the internal working of search API 204. As illustrated, users 220 enter search transaction details 221 (such as a particular TID) to obtain the current status of a transaction, which is passed to search API 204, and then to search and analytics engine 224 (via transaction details processing component 222) to obtain and/or determine other additional parameters in the search API 204. Search and analytics engine 224 returns the relevant information through transaction details processing component 222 and then queries inventory component 226 (which maintains mappings and relationship details pertaining to multiple integrations) to obtain and/or determine at least one dependency on the transaction in question (that is, when a main transaction/flow has at least one dependency transaction/flow underneath that must provide information before the main transaction/flow can proceed). Subsequently, the sequence proceeds to relational database management system 223 to obtain the actual values for any dependency parameters before returning an output to users 220 (via transaction details processing component 222).

FIG. 2B is similar to FIG. 2A but depicts additional logic for handling a scenario wherein the user wishes to see payload (that is, an entire data section) that is part of the transaction flow. Specifically, FIG. 2B depicts integrations 227-1, 227-2, 227-3, . . . , 227-N (collectively referred to herein as integrations 227), which are considered to determine a payload type in step 228. If the payload type is XML, then the sequence proceeds to wrapper API 230, which processes the XML payload via a message translator, and provides an output to the search and analytics engine 224 via API 229. If the payload type is JSON, then the payload is provided to the search and analytics engine 224 via API 229.

Figure 3:
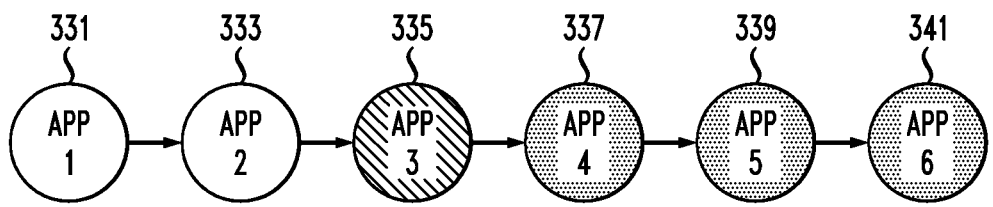
FIG. 3 shows an example transaction flow in an illustrative embodiment.

FIG. 3 shows an example transaction flow in an illustrative embodiment. Specifically, the illustrated end-to-end transaction flow view shows a transaction sequence from a first application 331, to a second application 333, to a third application 335, to a fourth application 337, to a fifth application 339, to a sixth application 341. As also illustrated in FIG. 3, the different shadings utilized represent different status determinations as generated by one or more embodiments. For instance, in the FIG. 3 example, application 331 and application 333 include no shading, which indicates that the transaction successfully proceeded through these applications without incident. Additionally, application 337, application 339, and application 341 include small-dot shading, which indicates that the transaction has not reached these applications. Further, application 335 includes a diagonally-striped shading, which indicates that the transaction encountered an error and/or issues at this application.

In accordance with the example illustration of FIG. 1, one or more embodiments include generating an end-to-end view of a transaction, and using such a view to automatically identify an error and/or issue at one or more particular points of the transaction flow. Additionally, as further detailed herein, such an embodiment includes initiating one or more automatic actions to correct and/or reprocess the transaction in connection with the particular application layer identified as corresponding to the error and/or issue. For example, at least one embodiment includes reprocessing the transaction or a portion thereof from a given source prior to the identified application layer corresponding to the error and/or issue.

Figure 4:
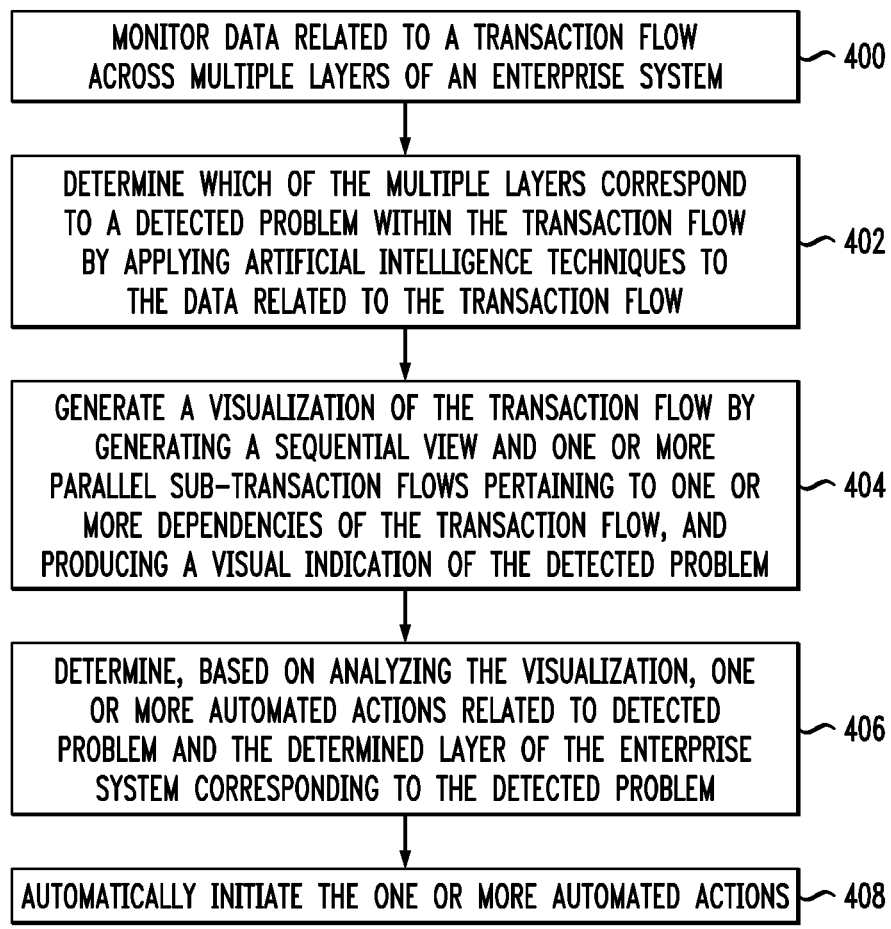
FIG. 4 is a flow diagram of a process for transaction visibility implemented using artificial intelligence in an illustrative embodiment.

FIG. 4 is a flow diagram of a process for transaction visibility implemented using artificial intelligence in an illustrative embodiment. It is to be understood that this particular process is only an example, and additional or alternative processes can be carried out in other embodiments.

In this embodiment, the process includes steps 400 through 408.

Step 400 includes monitoring data related to a transaction flow across multiple layers of at least one enterprise system.

Step 402 includes determining which of the multiple layers correspond to at least one detected problem within the transaction flow by applying one or more artificial intelligence techniques to the data related to the transaction flow. In at least one embodiment, the one or more artificial intelligence techniques include one or more rule-based diagnostic techniques. Also, determining which of the multiple layers correspond to the at least one detected problem can include determining at least one problem type attributed to the at least one detected problem. Additionally, determining which of the multiple layers correspond to the at least one detected problem can also include calculating a response time of transmission from at least a first application in the transaction flow to at least a second application in the transaction flow, and calculating an overall transmission time for the transaction end-to-end.

At least one embodiment also includes determining one or more problem-related patterns based at least in part on the at least one detected problem, and updating the one or more artificial intelligence techniques based at least in part on the one or more determined problem-related patterns.

Step 404 includes generating a visualization of the transaction flow, wherein generating the visualization comprises generating a sequential view of the transaction flow, generating one or more parallel sub-transaction flows pertaining to one or more dependencies of the transaction flow, and producing at least one visual indication of the at least one detected problem within the transaction flow.

Step 406 includes determining, based at least in part on analyzing the generated visualization, one or more automated actions related to the at least one detected problem and the determined layer of the at least one enterprise system corresponding to the at least one detected problem. In at least one embodiment, determining the one or more automated actions includes determining volume-related information associated with each of one or more applications within the transaction flow, and determining the one or more automated actions based at least in part on analyzing the generated visualization and on the volume-related information.

Step 408 includes automatically initiating the one or more automated actions. Automatically initiating the one or more automated actions can include identifying one or more identifiers missing from the transaction flow and processing, from at least one prior source in the transaction flow, the one or more identifiers missing from the transaction flow. Additionally, automatically initiating the one or more automated actions can include identifying one or more identifiers which caused a failure in the transaction flow, and processing, from at least one prior source in the transaction flow, the one or more identifiers which caused a failure in the transaction flow.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to track and trace, in real-time, details of end-to-end transactions of one or more data flows. These and other embodiments can effectively enable real-time visualization of data related to different transactions and enterprise segments.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
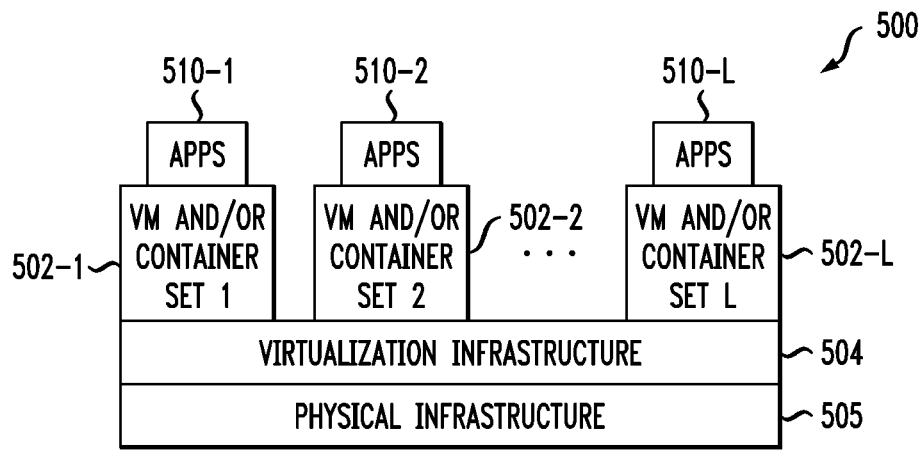
FIGS. 5 and 6 show examples of processing platforms that may be utilized to implement at least a portion of an information processing system in illustrative embodiments.
Figure 6:
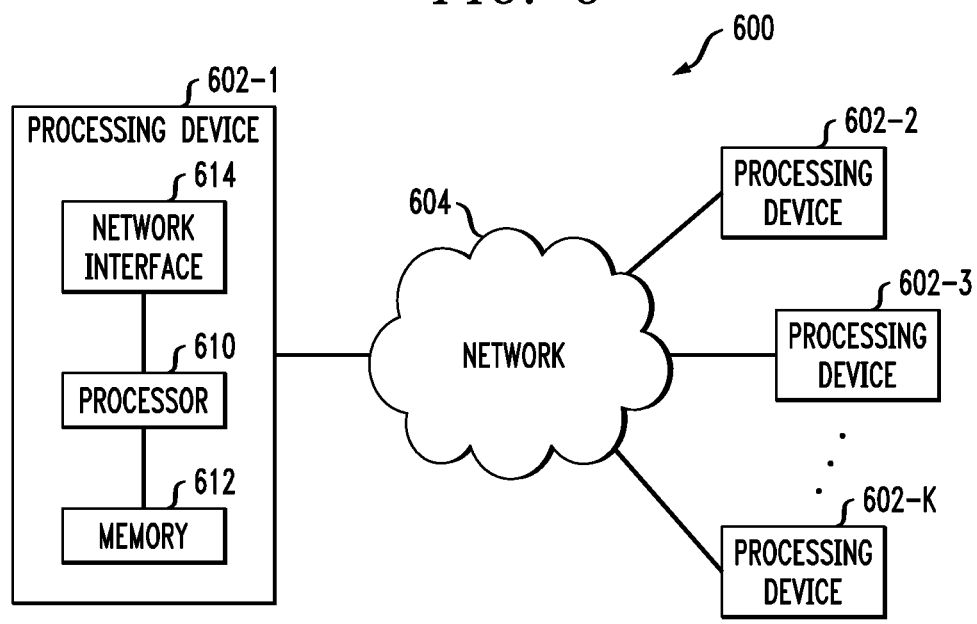

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

A hypervisor platform may be used to implement a hypervisor within the virtualization infrastructure 504, wherein the hypervisor platform has an associated virtual infrastructure management system. The underlying physical machines comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, ... 602-K, which communicate with one another over a network 604.

The network 604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 comprises a microprocessor, a microcontroller, an application-specific integrated circuit (ASIC), a field-programmable gate array (FPGA) or other type of processing circuitry, as well as portions or combinations of such circuitry elements.

The memory 612 comprises random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of UIs, APIs, data stores, services and devices in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
monitoring data related to a transaction flow across multiple layers of at least one enterprise system;
forecasting which of the multiple layers correspond to at least one detected problem within the transaction flow by applying one or more artificial intelligence techniques to the data related to the transaction flow;
generating a visualization of the transaction flow, wherein generating the visualization comprises generating a sequential view of the transaction flow, generating one or more parallel sub-transaction flows pertaining to one or more dependencies of the transaction flow, and producing at least one visual indication of the at least one detected problem within the transaction flow;
determining, based at least in part on analyzing the generated visualization, one or more automated actions related to the at least one detected problem and the forecasted layer of the at least one enterprise system corresponding to the at least one detected problem; and
automatically initiating the one or more automated actions comprising at least reprocessing at least a portion of the transaction flow from a given source in the transaction flow prior to the forecasted layer of the at least one enterprise system corresponding to the at least one detected problem and avoiding the forecasted layer of the at least one enterprise system corresponding to the at least one detected problem in carrying out at least a remaining portion of the transaction flow;

wherein the method is performed by at least one processing device comprising a processor coupled to a memory.

2. The computer-implemented method of claim 1, wherein the one or more artificial intelligence techniques comprise one or more rule-based diagnostic techniques.

3. The computer-implemented method of claim 1, wherein forecasting which of the multiple layers correspond to the at least one detected problem comprises determining at least one problem type attributed to the at least one detected problem.

4. The computer-implemented method of claim 1, wherein forecasting which of the multiple layers correspond to the at least one detected problem comprises:

calculating a response time of transmission from at least a first application in the transaction flow to at least a second application in the transaction flow; and calculating an overall transmission time for the transaction end-to-end.

5. The computer-implemented method of claim 1, further comprising:

determining one or more problem-related patterns based at least in part on the at least one detected problem.

6. The computer-implemented method of claim 5, further comprising:

updating the one or more artificial intelligence techniques based at least in part on the one or more determined problem-related patterns.

7. The computer-implemented method of claim 1, wherein determining the one or more automated actions comprises determining volume-related information associated with each of one or more applications within the transaction flow, and determining the one or more automated actions based at least in part on analyzing the generated visualization and on the volume-related information.

8. The computer-implemented method of claim 1, wherein automatically initiating the one or more automated actions comprises identifying one or more identifiers missing from the transaction flow.

9. The computer-implemented method of claim 8, wherein automatically initiating the one or more automated actions comprises processing, from at least one prior source in the transaction flow, the one or more identifiers missing from the transaction flow.

10. The computer-implemented method of claim 1, wherein automatically initiating the one or more automated actions comprises identifying one or more identifiers which caused a failure in the transaction flow.

11. The computer-implemented method of claim 10, wherein automatically initiating the one or more automated actions comprises processing, from at least one prior source in the transaction flow, the one or more identifiers which caused a failure in the transaction flow.

12. A non-transitory processor-readable storage medium having stored therein program code of one or more software programs, wherein the program code when executed by at least one processing device causes the at least one processing device:

to monitor data related to a transaction flow across multiple layers of at least one enterprise system;

to forecast which of the multiple layers correspond to at least one detected problem within the transaction flow by applying one or more artificial intelligence techniques to the data related to the transaction flow;

to generate a visualization of the transaction flow, wherein generating the visualization comprises generating a sequential view of the transaction flow, generating one or more parallel sub-transaction flows pertaining to one or more dependencies of the transaction flow, and producing at least one visual indication of the at least one detected problem within the transaction flow;

to determine, based at least in part on analyzing the generated visualization, one or more automated actions related to the at least one detected problem and the forecasted layer of the at least one enterprise system corresponding to the at least one detected problem; and to automatically initiate the one or more automated actions comprising at least reprocessing at least a portion of the transaction flow from a given source in the transaction flow prior to the forecasted layer of the at least one enterprise system corresponding to the at least one detected problem and avoiding the forecasted layer of the at least one enterprise system corresponding to the at least one detected problem in carrying out at least a remaining portion of the transaction flow.

13. The non-transitory processor-readable storage medium of claim 12, wherein the one or more artificial intelligence techniques comprise one or more rule-based diagnostic techniques.

14. The non-transitory processor-readable storage medium of claim 12, wherein automatically initiating the one or more automated actions comprises identifying one or more identifiers missing from the transaction flow.

15. The non-transitory processor-readable storage medium of claim 12, wherein automatically initiating the one or more automated actions comprises identifying one or more identifiers which caused a failure in the transaction flow.

16. The non-transitory processor-readable storage medium of claim 12, wherein forecasting which of the multiple layers correspond to the at least one detected problem comprises determining at least one problem type attributed to the at least one detected problem.

17. An apparatus comprising:

at least one processing device comprising a processor coupled to a memory;

the at least one processing device being configured:

to monitor data related to a transaction flow across multiple layers of at least one enterprise system;

to forecast which of the multiple layers correspond to at least one detected problem within the transaction flow by applying one or more artificial intelligence techniques to the data related to the transaction flow;

to generate a visualization of the transaction flow, wherein generating the visualization comprises generating a sequential view of the transaction flow, generating one or more parallel sub-transaction flows pertaining to one or more dependencies of the transaction flow, and producing at least one visual indication of the at least one detected problem within the transaction flow;

to determine, based at least in part on analyzing the generated visualization, one or more automated actions related to the at least one detected problem and the forecasted layer of the at least one enterprise system corresponding to the at least one detected problem; and to automatically initiate the one or more automated actions comprising at least reprocessing at least a portion of the transaction flow from a given source in the transaction flow prior to the forecasted layer of the at least one enterprise system corresponding to the at least one detected problem and avoiding the forecasted layer of the at least one enterprise system corresponding to the at least one detected problem in carrying out at least a remaining portion of the transaction flow.

18. The apparatus of claim 17, wherein the one or more artificial intelligence techniques comprise one or more rule-based diagnostic techniques.

19. The apparatus of claim 17, wherein automatically initiating the one or more automated actions comprises identifying one or more identifiers missing from the transaction flow.

20. The apparatus of claim 17, wherein automatically initiating the one or more automated actions comprises identifying one or more identifiers which caused a failure in the transaction flow.

\* \* \* \* \*